United States Patent [19]
Smith

[11] 3,731,188
[45] May 1, 1973

[54] SIGNAL ANALYSIS OF MULTIPLICATIVELY RELATED FREQUENCY COMPONENTS IN A COMPLEX SIGNAL

[75] Inventor: Spurgeon E. Smith, Austin, Tex.

[73] Assignee: Tracor, Inc., Austin, Tex.

[22] Filed: Apr. 19, 1971

[21] Appl. No.: 135,090

[52] U.S. Cl. .............................324/77 E, 328/167
[51] Int. Cl. ............................................G01r 23/16
[58] Field of Search.......................324/77; 179/1 SA; 328/140, 166, 167

[56] References Cited

UNITED STATES PATENTS

| | | |
|---|---|---|
| 3,473,121 | 10/1969 | Hurtig et al. .........................324/77 E |
| 3,582,957 | 6/1971 | Herleikson..........................324/77 R |
| 3,315,222 | 4/1967 | Bogs ....................................324/77 E |
| 3,140,710 | 7/1964 | Glassner ..............................324/77 E |
| 3,470,468 | 9/1969 | Halpern ...............................324/77 E |

Primary Examiner—Alfred E. Smith
Attorney—Arnold, White & Durkee

[57] ABSTRACT

Apparatus including a plurality of frequency-tunable filters controlled by a frequency synthesizer in turn controlled by a variable oscillator for examining a complex signal at frequency "bins" which are multiplicatively related, the amplitudes of the signals in these bins yielding quality information about the complex signal when compared to predetermined amounts known to be indicative of quality.

12 Claims, 3 Drawing Figures

Spurgeon E. Smith
INVENTOR

BY

Arnold, White & Durkee
ATTORNEYS

SIGNAL ANALYSIS OF MULTIPLICATIVELY RELATED FREQUENCY COMPONENTS IN A COMPLEX SIGNAL

BACKGROUND OF THE INVENTION

1. Field of the Invention

This invention relates to signal analysis and more specifically to analysis of a frequency spectrum for frequency components that bear a relation to each other.

2. Description of the Prior Art

It is often desirable to ascertain the frequency components or energy-density-versus-frequency found in a complicated or complex signal. A few such applications where examination of such unknown signals is performed is in the study of vibrations in rotating machinery, the interpretation of seismic data, the investigation of aircraft or shipping noise and the like.

Generically, the investigation of spectral content is known as "spectral analysis." It is common, for example, to investigate the power spectral density of an applied signal over a range of equally spaced frequency intervals. Theory shows that data sampled at a sampling interval ($h$) and for a total length of time ($T$) can be "analyzed" with a resolution in frequency of $\Delta f = 1/T$ Hz over the frequency band of 0 to $\frac{1}{2} h$ Hz. "The Measurement of Power Spectra", Blackman and Tukey.

The heavy requirement in modern industrial and other applications for power spectral studies has led to two procedures which rapidly accomplish spectral density analysis. These are: (1) computer techniques using one or another form of the Fast Fourier Transform (FFT) or the Cooley-Tukey algorithm and (2) various analog and hybrid analog-digital devices which carry out spectral analysis, such as the Federal Scientific UA-9 "Ubiquitous Analyzer." Both of these approaches have the advantage of investigating all of the frequency "bins" of width $\Delta f$ from one end of the band under study to the other.

However, this very completeness is not always an advantage. In certain specialized applications, where one is interested only in the energy distribution at some certain finite set of discrete frequencies, such complete and detailed transform analysis is redundant, wasteful and expensive.

It is therefore a feature of this invention to provide improved power spectral energy analysis by sampling only at frequencies having a known multiplicative relation to each other without wastefully examining the frequencies at multiplicative relations not of interest.

It is another feature of this invention to provide an improved power spectral energy evaluation of a complex signal and indicate the presence of a combination of frequencies therein.

It is yet another feature of this invention to provide an improved power spectral energy evaluation of a complex signal and indicate the presence of a combination of frequencies and amplitudes therein.

SUMMARY OF THE INVENTION

A preferred embodiment of the present invention for analyzing and evaluating the frequency components found in a complex signal includes a plurality of so-called synchronous or commutating filters for receiving the complex signal, the center frequencies for each being adjustably determined by the frequency of a separate, applied reference signal. A controlled variable oscillator is connected to a frequency synthesizer, the frequency synthesizer producing a plurality of outputs to the synchronous filters. The signals from the frequency synthesizer are multiplicatively related to each other such that as the variable oscillator frequency changes, so do the frequencies of the outputs from the frequency synthesizer, but the multiplicative relationship is maintained. The output from each of the filters may be applied to an individual rectifier and metering circuit. Alternatively, the output may be combined to present a single output indication when there is a combination of frequency components present. Threshold circuits may be included, as well, so that the single output will also be indicative of amplitude (or power content) of the frequencies.

Hence, it may be seen that by the present invention, power densities at frequencies selectively multiplicatively related to each other may be investigated without wasteful examination of frequencies not of interest. Or, alternatively, a pattern of frequencies at a known multiplicative relationship with respect to a preselected frequency may be examined. Or, alternatively, by applying a complex signal from an engine or turbine or like device, a ready distinction may be made from a properly running device (or an improperly running device) by using the detected frequency information as above determined. Such examination may thereby be used for detecting symptoms indicating incipient troubles.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted however that the appended drawings illustrate only typical embodiments of the invention and are therefore not to be considered limiting of its scope, for the invention may admit to other equally effective embodiments.

In the drawings.

DESCRIPTION OF PREFERRED EMBODIMENTS

Figure 1:
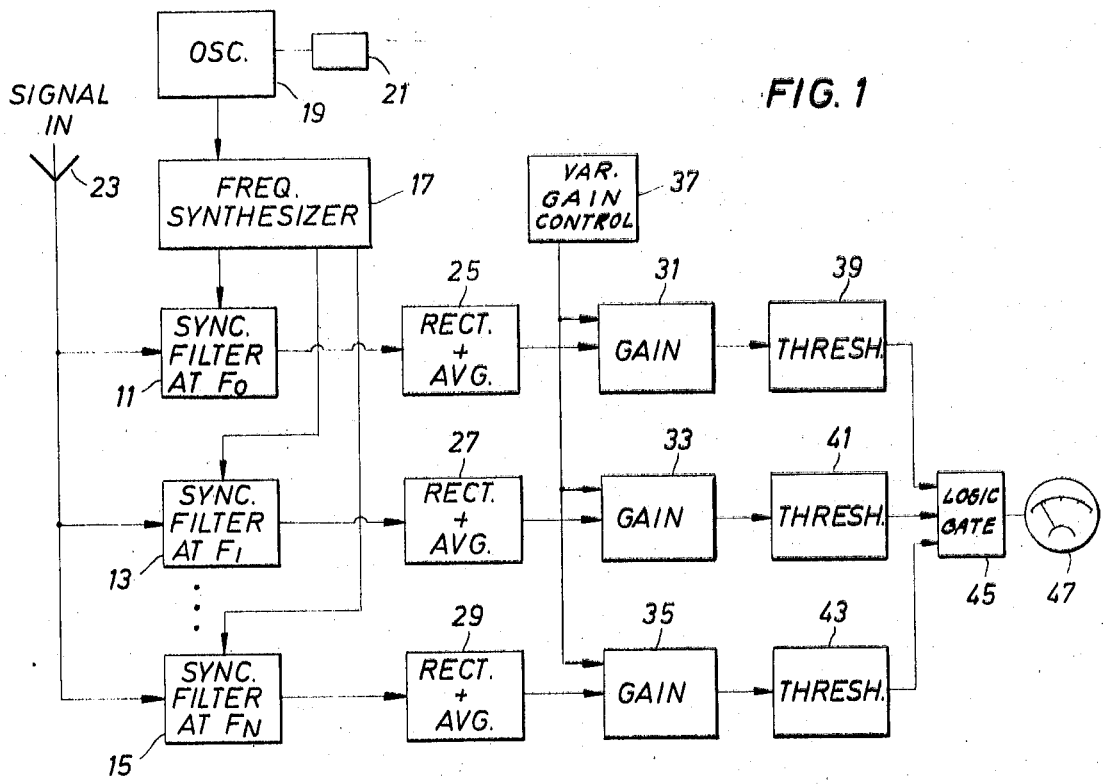
FIG. 1 is a block diagram of a preferred embodiment of this invention.

Referring to the drawings and first to FIG. 1, an embodiment utilizing a plurality of synchronous, or as they are sometimes called, commutating filters, 11, 13 and 15 are shown. Such filters are known in the art in various forms, one form being shown in "Want A Bandpass Filter?" B. Broeker, *Electronic Design*, Vol. 18, No. 22, Oct. 25, 1970, pages 76–78.

The operation of a synchronous filter is based on switching between N identical low-pass filter sections at a clock rate N times the desired center frequency. This switching has the effect of reflecting the low-pass response about the switching or commutating frequency, thereby generating a bandpass response. The bandwidth of a synchronous filter is 2/N times the bandwidth of the original low-pass sections.

The operation of a synchronous filter may readily be understood by considering a simple low-pass filter section acting as an integrator with a time constant of $\tau =$ RC. If N sections are cascaded together with a commutating switch, the switch rotates at a commutating frequency of $f_c$ rotations per second. Since the capacitor of each integrator filter section is connected to the input only 1/Nth of the time, its time constant is increased by N; or, the time constant for a filter section is $\tau' = $ NRC. Assuming all sections are the same, the time constant for the cascaded group is also $\tau' = $ NRC, yielding a 3-db low-pass response $F_{lp} = $ ½ NRC. The output of this commutated low-pass filter is in step format where each capacitor charges toward the average voltage applied during 1/Nth segment of time that the input signal is applied. A signal separated from the resonant frequency by some value, such as $f_s$ Hz ($fc \pm fs$) appears the same as $f_s$ to the low-pass sections, thereby generating a folded bandpass response equal about $f_c$ which is twice the low frequency response. Hence, the bandwidth of a synchronous filter is 2/N times the bandwidth of the original low-pass sections.

It may be further seen that the rate of switching determines the center frequency of a synchronous filter. Hence, when this rate is determined by an applied signal from a tunable oscillator, by tuning the oscillator to a new frequency the center frequency of the filter is changed. Moreover, a synchronous filter does not have a natural resonance of its own, so the center frequency determination is solely a function of the applied reference signal.

Also, referring to FIG. 1, it may be observed that the embodiment there illustrated utilizes a frequency synthesizer 17. A frequency synthesizer typically is comprised of a system of phase shifters, frequency multipliers and/or frequency dividers. A frequency synthesizer may also include circuits for converting an incoming sinusoidal signal to a square wave signal, counter circuits, and digital-to-analog circuits.

Although there are numerous ways of accomplishing the production of related outputs, which are well known in the prior art and are of no particular importance to the present invention, a frequency synthesizer may be defined as a device for producing a plurality of outputs, each of said outputs maintaining the same multiplicative relationship in frequency to the input regardless of the changes in the frequency of the input. For example, a frequency synthesizer may have five outputs respectively related to the input by the following factors: 1/40; 1/5; 4; 1/3; 1/1000. For a 1000 Hz input, the output frequencies are 25 Hz; 200 Hz; 4000 Hz; 333⅓ Hz and 1 Hz. For a 2000 Hz input, this same frequency synthesizer would produce the following respective outputs: 50 Hz; 400 Hz; 8000 Hz; 66⅔ Hz and 2 Hz.

Now returning to FIG. 1, an oscillator 19, tunable or variable via control 21, is connected to frequency synthesizer 17. Frequency synthesizer 17 has a plurality of outputs, but for illustrative purposes three outputs are shown, one each connected to synchronous filters 11, 13 and 15. Synchronous filter 11 has a center frequency at $f_o$; synchronous filter 13 has a center frequency at $f_i$ and synchronous filter 15 has a center frequency at $f_n$. These center frequencies are respectively determined by the frequency of the signal applied thereto from frequency synthesizer 17.

Also supplied to each of said synchronous filters is a common complex signal to be "analyzed." Typically such a signal is supplied via an antenna 23 or other common source. If there is present in the complex signal a component within the passband of a synchronous filter, then this synchronous filter will permit passage thereof to subsequent circuits for further processing.

It may be seen, however, that each synchronous filter "looks for" or "looks at" just the multiplicative related "slot" or "bin" of interest, all the rest of the spectrum being filtered out. Hence, there is effected an economy of subsequent computer time, hardware, display facilities and operator attention over prior art systems which "look for" or "look at" the entire spectrum.

To be specific, consider a complex signal δ which is periodic at some (possibly unknown) frequency $f_o$ and with the properties that (1) there is a known sequence of factors $k_1, k_2 \ldots k_n$, and (2) a known sequence of amplitudes $A_o, A_1, A_2 \ldots A_n$, such that if there is a signal at frequency $f_o$ of amplitude $A_o$, then there is also a signal of amplitude $A_1$ at frequency $k_1 f_o$, a signal of amplitude $A_2$ at frequency $k_2 f_o$, and a signal of amplitude $A_n$ at frequency $k_n f_o$. Thus, the signal δ has the description:

$$\delta = \begin{cases} \text{Frequency} & \text{Amplitude} \\ f_o & A_o \\ k_1 f_o & A_1 \\ k_2 f_o & A_2 \\ \cdot & \cdot \\ \cdot & \cdot \\ k_n f_o & A_n \end{cases}$$

δ may be thought of as the class of all signals of the form $B[A_o \sin(2\pi f_o t + \phi_o) + A_1 \sin(2\pi k_1 t + \phi_1) + A_2 \sin(2\pi k_2 f_o t + \phi_2) + \ldots ]$, where the phases $\pi_o, \pi_1, \ldots$, and the scale factor B are all unspecified. Notice that the amplitudes may all be equal, but in the general case, they are not. Threshold circuits within the synchronous filters may be used to pass signals in the passband only if they are in excess of the threshold values.

In order to look for δ, it is only necessary to adjust control 21 connected to oscillator 19 to make the oscillator fundamental agree with $f_o$. Then, at each of the frequencies $k_i f_o$, there is a narrow filter tuned to the ith component of δ.

The outputs of the filters may be examined as separate sources of information, or, as shown in FIG. 1, they may be rectified and averaged in circuits 25, 27 and 29, respectively; scaled in gain circuits 31, 33 and 35, respectively (as may be controlled by a variable gain control 37); supplied to threshold circuits 39, 41 and 43, respectively (when it is desirable to amplitude detect following the integration and gain stages); combined in an accumulator means or a logic gate 45; and metered in meter 47.

Several options are available for the metering and the circuits immediately preceding. For instance, if logic gate 45 is an additive circuit, then the cumulative total of the amplitudes applied thereto will be singly metered. Hence, there may not even be one or more of the outputs present, but if there is a sufficient number present in sufficient amplitude there will be a register on the meter.

Alternatively, logic gate 45 may be an OR gate circuit wherein one acceptable output will cause the meter to register.

Or, logic gate 45 may be an AND circuit wherein it is necessary for each input thereto to be present for the meter to register.

Or, logic gate 45 may be a counter wherein the meter will register when there are an acceptable number of inputs.

Other acceptable circuits may be employed as well, to make the circuit an effective diagnostic index.

An example of actual use of the present invention may be considered in an application for investigating the behavior of an engine. Suppose experience has taught that, when the engine is running at a speed $2f_o$ (so that the camshaft frequency is $f_o$), when all is well, the important harmonics of the sound issuing from the engine are in amplitudes as shown below. (Harmonics are special multiplicatively related signals assumed for purposes of discussion. In actual practice, satisfactory performance may be measured by signals multiplicatively, but not harmonically, related. Also, for simplicity all harmonics through the seventh are used, wherein some may be unimportant and hence related filters and synthesizing circuit components may be omitted).

$$\delta_g = \begin{cases} \text{Good Operation} \\ f_o & A_1 \\ 2f_o & A_2 \\ 3f_o & A_3 \\ 4f_o & A_4 \\ 5f_o & A_5 \\ 6f_o & A_6 \\ 7f_o & A_7 \end{cases}$$

wherein $\delta g$ stands for a "good" complex signal.

When oscillator 19 and frequency synthesizer 17 of FIG. 1 are set to produce the appropriate filtering, the meter will register when the engine is properly running (producing $\delta g$) and will not register when the engine is not producing $\delta g$.

Suppose experience has also taught that some other set of proportionate amplitudes for these same frequencies (or for another set of multiplicatively related frequencies) is a good indicator of trouble, then the following table would apply for a "bad" complex signal $\delta_b$.

$$\delta_b = \begin{cases} \text{Bad Operation} \\ f_o & T_1 \\ 2f_o & T_2 \\ 3f_o & T_3 \\ 4f_o & T_4 \\ 5f_o & T_5 \\ 6f_o & T_6 \\ 7f_o & T_7 \end{cases}$$

wherein, $T_1$ through $T_7$ indicate amplitudes for related signals indicating "bad" engine operation. If the meter registers when oscillator 19 and frequency synthesizer 17 are set for this "bad" indication, the engine is not running well (engine operation indicates incipient trouble).

Figure 2:
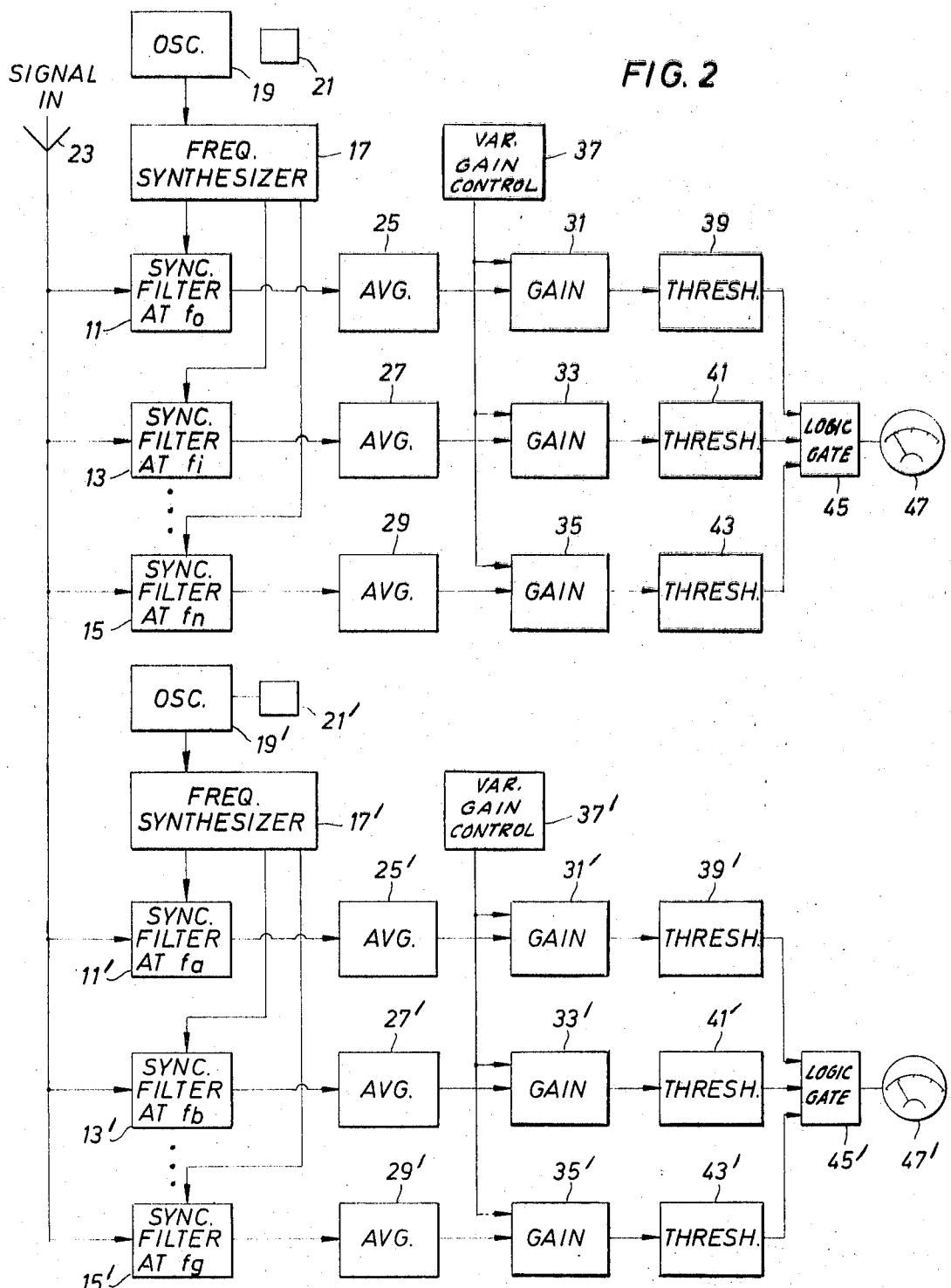
FIG. 2 is a block diagram of another embodiment of this invention.

These two diagnostic indices may be combined in operation as illustrated in FIG. 2, wherein the "good" signals are metered at the top and the "bad" signals are metered at the bottom. The same numerals are used for the "good" signal portion as was used in FIG. 1. Similarly, the same numerals with prime symbols are used for the "bad" signal portion. It is assumed that $f_a$, $f_b$ and $f_q$, the center frequencies for the synchronous filters in the "bad" signal section, are different from $f_o$, $f_l$ and $f_n$, the center frequencies for the synchronous filters in the "good" signal section. However, if the same multiplicatively related frequencies are used as a measure of "good" and "bad" operation, only the amplitude values thereof determining meter variation, a savings of frequency synthesizers and synchronous filters may be effected. The two circuits would be common except for the two metering and related circuits, which would only differ in the scaling or gain related circuits and possibly the threshold settings of the threshold circuits.

Figure 3:
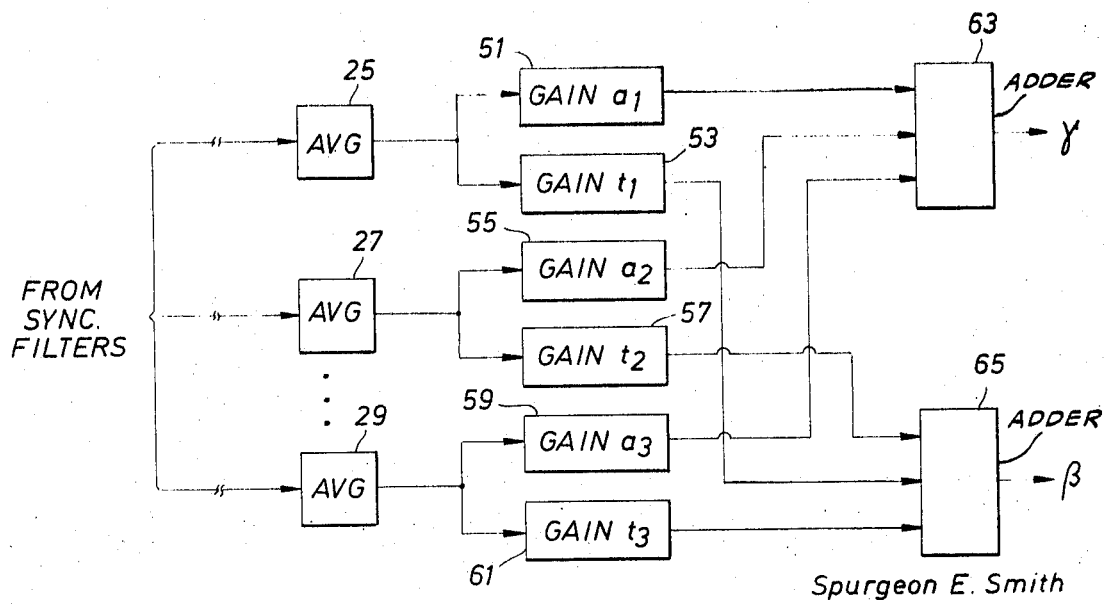
FIG. 3 is a partial block diagram of yet another embodiment of this invention.

A more sophisticated circuit for comparing operation against "good" and "bad" criteria is illustrated in FIG. 3. Here, again, the same frequencies are selected for "good" and "bad" operation, the amplitude at these frequencies being used as determining which operation is "closest" to the actual operation of the engine (or other device) being investigated.

FIG. 3 assumes the same circuit shown in FIG. 1 through the integrator-averager circuits 25, 27 and 29. That is, these circuits receive their inputs from synchronous filters which are connected and controlled in the manner previously discussed with respect to FIG. 1. The output from averager circuit 25 is connected to gain circuits 51 and 53; the output from averager circuit 27 is connected to gain circuits 55 and 57; and the output from averager circuit 29 is connected to gain circuits 59 and 61. The outputs from gain circuits 51, 55 and 59 are summed in adder 63 and the outputs from gain circuits 53, 57 and 61 are summed in adder 65.

To understand the significance of the scaling provided by the gain circuits shown in FIG. 3, let $a_i$ be equal approximately to that value of gain that would permit $A_i$ to reach a standard value. For example, if $A_i$ (the general amplitude value of one of the selected frequencies that indicates "good" operation) is equal to 0.5 and all values were being raised to a common level of 1 before adding (so that all signals at the selected frequencies would be given equal weight in the final results), the value of $a_i$ would be 2. Then, let D be some positive constant. Then, $$\sum_1^n a_i^2$$

may be made equal to $D^2$.

Similarly, let $t_i$ be equal approximately to that value of gain that would permit $T_i$ to reach a standard value (the general amplitude value of one of the selected frequencies that indicates "bad" operation). Then, $$\sum_1^n t_i^2$$

may be made to equal $D^2$.

If the output of adder 63 is equal to $\gamma$ and the output of adder 65 is equal to $\beta$, the "closeness" or "likeness" of actual operation can be compared with $\gamma$ and $\beta$.

Suppose the actual signal received has the form as follows:

$$\delta_c = \begin{cases} \text{Frequency} & \text{Amplitude} \\ f_o & C_1 \\ 2f_o & C_2 \\ 3f_o & C_3 \\ 4f_o & C_4 \\ 5f_o & C_5 \\ 6f_o & C_6 \\ 7f_o & C_7 \end{cases}$$

Then, $\gamma = \sum_{1}^{7} C_i a_i$ and, $\beta = \sum_{1}^{7} C_i t_i$

By requiring $$\sum a_i^2 = D^2 = \sum t_i^2$$

confusion is removed which might otherwise be caused by changes in scale or size of the overall C values without a change in their relative proportion. The constant which is involved does not interfere in determining if $\delta_c$ is more in proportion to good signal $\delta_g$ or to bad signal $\delta_b$.

In practice, bounds can be set on the value, say of the fraction $\gamma/\beta$, and on the basis of such bounds, decisions regarding engine overhaul or the like may be made.

While particular embodiments of the invention have been shown, it will be understood that the invention is not limited thereto, since many modifications may be made and will become apparent to those skilled in the art.

What is claimed is:

1. Apparatus for determining the frequency components to be found in a complex signal, the frequency components having a multiplicative relationship to each other, comprising
    a plurality of synchronous filters, the center frequency of each of said synchronous filters being adjustably determined by the frequency of an applied reference signal, the complex signal being applied to each of said filters for determining the existence of a signal in the passband thereof,
    a frequency synthesizer for producing a plurality of output signals, the frequencies of which are multiplicatively related to each other, said output signals being connected respectively as the applied reference signals to said plurality of synchronous filters,
    a variable oscillator connected as the input to said frequency synthesizer, a frequency change of said oscillator causing the frequencies of the signal outputs from said synthesizer to change, and
    means connected to said filters for indicating the amplitude of the frequency components passed by said synchronous filters.

2. Apparatus as described in claim 1, and including frequency control means connected to said variable oscillator, the frequency control setting thereof having a predetermined passband center frequency selection relationship with each of said synchronous filters.

3. Apparatus as described in claim 1, wherein said indicating means for each filter includes an amplitude averager.

4. Apparatus as described in claim 1, wherein said indicating means includes a separate circuit connected to each filter, comprising
    rectifier means for development of an average amplitude for the signal passed by said filter, and
    metering means connected to said rectifier means for visually presenting said amplitude.

5. Apparatus for determining the frequency components to be found in a complex signal, the frequency components having a multiplicative relationship to each other, comprising
    a plurality of synchronous filters, the center frequency of each of said synchronous filters being adjustably determined by the frequency of an applied reference signal, the complex signal being applied to each of said filters for determining the existence of a signal in the passband thereof,
    a frequency synthesizer for producing a plurality of output signals, the frequencies of which are multiplicatively related to each other, said output signals being connected respectively as the applied reference signals to said plurality of synchronous filters,
    a variable oscillator connected as the input to said frequency synthesizer, a frequency change of said oscillator causing the frequencies of the signal outputs from said synthesizer to change;
    a separate amplitude averager circuit connected to the output of each of said filters,
    a threshold level detector circuit connected to each of said amplitude averager circuits, each threshold level detector circuit producing an output when the amplitude averager circuit produces a signal having an amplitude in excess of the threshold level, the threshold level for each of said threshold level detector circuits being independently adjustable, and
    means connected to said threshold detector circuits for indicating the frequency components passed by said synchronous filters that produce an average amplitude in excess of the threshold level settings of said threshold level detector circuits.

6. Apparatus for determining the satisfactory performance of a physical system producing a signal having a complex signal spectrum, the spectrum indicating satisfactory performance when frequencies having a known multiplicative and amplitude relationship to each other are within predetermined limits, comprising
    a plurality of synchronous filters, the center frequency of each of said synchronous filters being adjustably determined by the frequency of an applied reference signal, the signal having the complex signal spectrum being applied to each of said filters for determining the existence of a signal in the passband thereof,
    a frequency synthesizer for producing a plurality of output signals, the frequencies of which are multiplicatively related to each other in the predetermined relationship, said output signals being connected respectively as the applied reference signals to said plurality of synchronous filters,
    a variable oscillator connected as the input to said frequency synthesizer, a frequency change of said oscillator causing the frequencies of the signal outputs from said synthesizer to change, a separate amplitude averager circuit connected to the output of each of said filters, a threshold level detector circuit connected to each of said amplitude averager circuits, each threshold level detector circuit producing an output when the amplitude averager circuit produces a signal having an amplitude in excess of the threshold level, the threshold level for each of said threshold level detector circuits being independently adjustable in accordance with the predetermined relationship, and AND circuit means connected to each of said threshold level detector circuits, an output therefrom evidencing satisfactory performance of the physical system.

7. Apparatus for determining the unsatisfactory performance of a physical system producing a signal having a complex signal spectrum, the spectrum indicating unsatisfactory performance when frequencies having a known multiplicative and amplitude relationship to each other are within predetermined limits, comprising a plurality of synchronous filters, the center frequency of each of said synchronous filters being adjustably determined by the frequency of an applied reference signal, the signal having the complex signal spectrum being applied to each of said filters for determining the existence of a signal in the passband thereof, a frequency synthesizer for producing a plurality of output signals, the frequencies of which are multiplicatively related to each other in the predetermined relationship, said output signals being connected respectively as the applied reference signals to said plurality of synchronous filters, a variable oscillator connected as the input to said frequency synthesizer, a frequency change of said oscillator causing the frequencies of the signal outputs from said synthesizer to change, a separate amplitude averager circuit connected to the output of each of said filters, a threshold level detector circuit connected to each of said amplitude averager circuits, each threshold level detector circuit producing an output when the amplitude averager circuit produces a signal having an amplitude in excess of the threshold level, the threshold level for each of said threshold level detector circuits being independently adjustable in accordance with the predetermined relationship, and AND circuit means connected to each of said threshold level detector circuits, an output therefrom evidencing unsatisfactory performance of the physical system.

8. Apparatus for determining the satisfactory performance of a physical system producing a signal having a complex signal spectrum, the spectrum indicating satisfactory performance when frequencies having a known multiplicative and amplitude relationship to each other are within predetermined limits, comprising a plurality of synchronous filters, the center frequency of each of said synchronous filters being adjustably determined by the frequency of an applied reference signal, the signal having the complex signal spectrum being applied to each of said filters for determining the existence of a signal in the passband thereof, a frequency synthesizer for producing a plurality of output signals, the frequencies of which are multiplicatively related to each other in the predetermined relationship, said output signals being connected respectively as the applied reference signals to said plurality of synchronous filters, a variable oscillator connected as the input to said frequency synthesizer, a frequency change of said oscillator causing the frequencies of the signal outputs from said synthesizer to change, a separate amplitude averager circuit connected to the output of each of said filters, a threshold level detector circuit connected to each of said amplitude averager circuits, each threshold level detector circuit producing an output when the amplitude averager circuit produces a signal having an amplitude in excess of the threshold level, the threshold level for each of said threshold level detector circuits being independently adjustable in accordance with the predetermined relationship, and accumulator means connected to each of said threshold level detector circuits, an output above a predetermined amount indicating satisfactory performance.

9. Apparatus for determining the unsatisfactory performance of a physical system producing a signal having a complex signal spectrum, the spectrum indicating unsatisfactory performance when frequencies having a known multiplicative and amplitude relationship to each other are within predetermined limits, comprising a plurality of synchronous filters, the center frequency of each of said synchronous filters being adjustable determined by the frequency of an applied reference signal, the signal having the complex signal spectrum being applied to each of said filters for determining the existence of a signal in the passband thereof, a frequency synthesizer for producing a plurality of output signals, the frequencies of which are multiplicatively related to each other in the predetermined relationship, said output signals being connected respectively as the applied reference signals to said plurality of synchronous filters, a variable oscillator connected as the input to said frequency synthesizer, a frequency change of said oscillator causing the frequencies of the signal outputs from said synthesizer to change, a separate amplitude averager circuit connected to the output of each of said filters, a threshold level detector circuit connected to each of said amplitude averager circuits, each threshold level detector circuit producing an output when the amplitude averager circuit produces a signal having an amplitude in excess of the threshold level, the threshold level for each of said threshold level detector circuits being independently adjustable in accordance with the predetermined relationship, and accumulator means connected to each of said threshold level detector circuits, an output above a predetermined amount indicating unsatisfactory performance.

10. Apparatus for analyzing a complex signal, frequency components therein having a predetermined frequency multiplicative relationship to each other and a predetermined proportionate amplitude relationship to each other, comprising a plurality of synchronous filters, the center frequency of each of said synchronous filters being adjustably determined by the frequency of an applied reference signal, the signal having the complex signal spectrum being applied to each of said filters for determining the existence of a signal in the passband thereof, a frequency synthesizer for producing a plurality of output signals, the frequencies of which are multiplicatively related to each other in the predetermined relationship, said output signals being connected respectively as the applied reference signals to said plurality of synch-ronous filters, a variable oscillator connected as the input to said fre-quency synthesizer, a frequency change of said oscillator causing the frequencies of the signal outputs from said synthesizer to change, a separate amplitude averager circuit connected to the output of each of said filters, a gain circuit connected to each of said separate amplitude averager circuits to increase the gain of the signal therefrom by the predetermined proportionate amount with respect to the other of said gain circuits to produce a substantially equal output amplitude for each of said gain circuits.

a threshold level detector circuit connected to each of said gain circuits, each threshold level detector circuit producing an output when the gain circuit produces an amplitude in excess of the threshold level, and means connected to said threshold detector circuits for indicating the frequency-multiplicatively related signals passed by said synchronous filters that produce an average amplitude in excess of the predetermined proportionate amplitude amounts.

11. Apparatus for determining whether the frequency components found in a complex signal are closer in related overall amplitude values to a first group of related amplitudes or to a second group of related amplitudes, comprising a plurality of filters, one each for isolating the frequency components found in the complex signal, a first set of amplitude gain means, one connected to each of said filters, for raising the amplitudes to the values of the first group, a second set of amplitude gain means, one connected to each of said filters, for raising the amplitudes to the values of the second group, first combining means connected to each of said first set of amplitude gain means for producing a first output, said first output being equal to a predetermined value when the amplitudes of said frequency components are equal to said first group of related amplitudes, and second combining means connected to each of said second set of amplitude gain means for producing a second output, said second output being equal to a predetermined value when the amplitudes of said frequency components are equal to said second group of related amplitudes.

12. Apparatus as described in claim 11, wherein said first combining means is an adder, the square of each of said gains means in said first set produces an output for the related amplitude of said first group of related amplitudes such that the output from said first combining means is equal to a predetermined amount, said second combining means is an adder, and the square of each of said gains means in said second set produces an output for the related amplitude of said second group of related amplitudes such that the output from said second combining means is equal to said predetermined amount, the ratio of the outputs from said first and second combining means being an indication of which of said first and second groups of related amplitudes the amplitudes of the isolated frequency components of said complex signal most resemble, a ratio of one indicating equal similarity to both groups, a ratio greater than one indicating a comparative similarity to one of said groups and a ratio less than one indicating a comparative similarity to the other of said groups.

* * * * *